Figure 1:
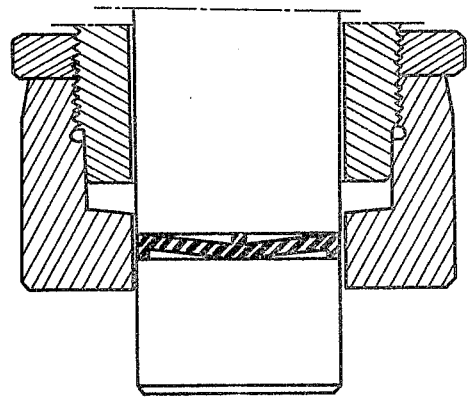

Nov. 29, 1966  J. BENOIT  3,288,475

TORIC PACKING

Filed March 11, 1963

INVENTOR
Jean Benoit
By: Paul M. Craig, Jr.
ATTORNEY

United States Patent Office 3,288,475
Patented Nov. 29, 1966

3,288,475
TORIC PACKING
Jean Benoit, Villennes-sur-Seine, France, assignor to
Le Joint Francais, Paris, France
Filed Mar. 11, 1963, Ser. No. 264,397
Claims priority, application France, June 6, 1962,
899,904
3 Claims. (Cl. 277—205)

My patent application S.N. 108,780 now Patent No. 3,147,984 relates to a toric packing which is tight to fluid under pressure, comprising nipples directed to each side of the median plane of the packing, preferably perpendicularly to that plane.

As the description of that application reveals, the radial section of the packing is usually a circle, but may be an ellipse, an oval, etc.

Toric packings thus modified have been found to have a long useful life as a result of the scraping effect of the oil produced by the undulating configuration imposed on the packing in its seat.

In view of the excellent results obtained, the same arrangements have been applied to other packing rings of different configuration and comprising flexible, even resilient material inserted between two cylindrical elements which are displaceable relative to each other and one of which has an annular groove for housing the ring. These modified rings have also proved to have a notably longer useful life.

The present invention consists of a packing ring of flexible, compressible and resilient material, with nipples directed to each side of the median plane of the ring perpendicularly to this plane, as claimed in application S.N. 108,780, the radial section of this ring being delimited by a perimeter other than a closed regular curve, and the nipples being so distributed at points on the section that displacement and normal expansion of the material of the ring when fitted are freely permitted, thus improving tightness. The perimeter delimiting the radial section of the ring may for example be a square with or without lips, an X formed by joined curved or straight lines, a dish of which the concavity faces the axis of the ring, etc.

The invention will now be described, by way of example only, with reference to the accompanying drawings. All the packings shown in the drawings, whatever their cross-section, have nipples 3 at the places stated in application S.N. 108,780 along their annular contour.

FIGURE 1 of the drawings recalls the position adopted by such a packing or ring after being placed in a groove between two elements which carry out an angular movement relative to each other, as revealed in the parent application.

Figure 2:
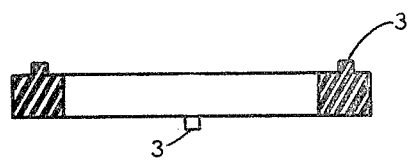

FIGURE 2 shows a ring of which the section is substantially square. The nipples are simply arranged on the median circumference of the upper and lower surfaces of the ring, which can then give tightness and sweep or scrape the oil as usual.

Figure 3:
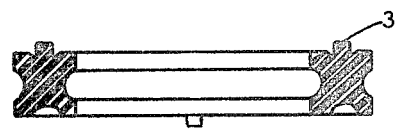
Figure 4:
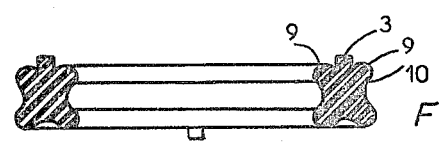

FIGURES 3 and 4 show rings of X-shaped section. In FIGURE 3 the contour of the section comprises straight and curved portions, while in FIGURE 4 it is entirely curved, as described for example in U.S. Patent No. 2,873,132.

The ring shown in FIGURE 4 is now known in the trade under the name of the "Quad Ring" packing.

Figure 7:

The packings illustrated in FIGURES 3 and 4 are designed to be able to move and expand in their housings under the influence of the fluid pressure so as to ensure tightness. They must not jam or be subjected to excessive friction if they are to do this for a long time. It has been found that the functioning of these packings is not impaired when the nipples 3 are arranged in the manner shown in FIGURES 3 and 4, in the hollows of the upper and lower concavities. Alternatively, each nipple can be divided symmetrically into two elements 3 on the convex swellings 9, as shown in FIGURE 7.

Figure 5:
Figure 6:

FIGURES 5 and 6 show rings with dish-shaped cross-sections, but in FIGURE 6 the dish is turned about 90° compared with the dish in FIGURE 5.

In the ring in FIGURE 5, the nipples 3 are relatively high and are based on the bottom of the dish. In the case of the ring of FIGURE 6, it has been found that the nipples must be moved to approximately halfway between the upper or lower median circumference of the ring and the outer edge of the ring. The lips 11 of the dish can thus still play their part and give tightness, following an undulating path pressed against the side wall facing them in the groove.

In general it may be said that if the section of the ring is symmetrical relative to an axis perpendicular to the plane of the packing, the nipples are arranged on the upper and lower median circumferences of the packing; alternatively, however, each nipple may be divided into a pair consisting of two elements arranged symmetrically relative to the median circumference concerned. This is for example the case in FIGURES 2 to 5 and 7. Where the section is not symmetrical relative to its axis perpendicular to the ring's plane, each nipple is displaced towards the narrower part of the section, as in FIGURE 6.

I claim:

1. A packing ring of flexible, compressible, and resilient material, with nipples directed to each side of the median plane of the ring perpendicularly to this plane, the radial section of this ring being of external configuration resembling a polygon having at least four sides and the nipples being so distributed at widely spaced points on the section that displacement or normal expansion of the material of the ring when fitted is freely permitted, thus improving tightness, the section being asymmetrical relative to an axis perpendicular to the plane of the ring, and the nipples being placed towards the narrower part of the section.

2. A packing ring of flexible, compressible, and resilient material, with nipples directed to each side of the median plane of the ring perpendicularly to this plane, the radial section of this ring being of external configuration resembling a polygon having at least four sides and the nipples being so distributed at widely spaced points on the section that displacement or normal expansion of the material of the ring when fitted is freely permitted, thus improving tightness, the section presenting an incurved portion so as to form a groove facing the interior of the ring.

3. A packing ring of flexible, compressible, and resilient material, with nipples directed to each side of the median plane of the ring perpendicularly to this plane, the radial section of this ring being of external configuration resembling a polygon having at least four sides and the nipples being so distributed at widely spaced points on the section that displacement or normal expansion of the material of the ring when fitted is freely permitted, thus improving tightness, said section presenting an incurved portion so as to form a groove on the top of the ring.

References Cited by the Examiner

UNITED STATES PATENTS

| | | | |
|---|---|---|---|
| 2,247,609 | 7/1941 | Devilbliss | 277—207 |
| 2,571,500 | 10/1951 | Trevaskis | 277—32 |
| 2,841,429 | 7/1958 | McCuistion | 277—209 |
| 2,873,132 | 2/1959 | Tanner | 277—209 |
| 2,997,318 | 8/1961 | Lansky et al. | 277—205 |
| 3,147,984 | 9/1964 | Benoit | 277—237 |

FOREIGN PATENTS

| | | |
|---|---|---|
| 1,267,218 | 6/1961 | France. |
| 5,175 | 2/1914 | Great Britain. |
| 483,089 | 7/1953 | Italy. |

SAMUEL ROTHBERG, *Primary Examiner.*

EDWARD V. BENHAM, *Examiner.*